United States Patent
Jard et al.

(10) Patent No.: US 6,925,110 B2
(45) Date of Patent: Aug. 2, 2005

(54) SIGNAL PROCESSING METHOD AND DEVICE FOR A SPREAD SPECTRUM RADIO COMMUNICATION RECEIVER

(75) Inventors: Alexandre Jard, Paris (FR); Hassan El Nahas El Homsi, Paris (FR); Moussa Abdi, Paris (FR)

(73) Assignee: Nortel Networks Limited, Quebec (CA)

(*) Notice: Subject to any disclaimer, the term of this patent is extended or adjusted under 35 U.S.C. 154(b) by 777 days.

(21) Appl. No.: 10/024,953

(22) Filed: Dec. 19, 2001

(65) Prior Publication Data
US 2002/0122508 A1 Sep. 5, 2002

(30) Foreign Application Priority Data
Dec. 22, 2000 (FR) .......................................... 00 16925

(51) Int. Cl.[7] .................................................. H04B 1/69
(52) U.S. Cl. ...................................................... 375/152
(58) Field of Search ................................ 375/133, 141, 375/143, 152, 259, 285, 220

(56) References Cited

U.S. PATENT DOCUMENTS 5,909,465 A 6/1999 Bottomley et al.
6,017,143 A * 1/2000 Eryurek et al. ............... 700/51

FOREIGN PATENT DOCUMENTS

EP 0 952 682 10/1999

OTHER PUBLICATIONS

Abeta S. et al., "Performance Comparison Between Time–Multiplexed Pilot Channel and Parallel Pilot Channel for Coherent Rake Combining in DS–CDMA Mobile Radio", IEICE Transactions on Communications, Institute of Electronics Information and Communication Engineering, Tokyo, Japan, vol. E81–B, No. 7, pp. 1417–1425.

* cited by examiner

Primary Examiner—Emmanuel Bayard
(74) Attorney, Agent, or Firm—DLA Piper Rudnick Gray Cary US LLP

(57) ABSTRACT

A digital signal available at the output of a filter matched to a spreading code in a spread spectrum receiver comprises successive blocks each corresponding to a sequence of symbols sent by a transmitter. Statistical parameters representing a channel having at least one propagation path between the transmitter and the receiver are estimated, and each block of the digital signal is processed so as to estimate instantaneous amplitudes of reception of the symbols of the corresponding sequence sent by the transmitter. The processing of a block comprises the prior estimation of information symbols of the corresponding sequence, then the estimation of the instantaneous amplitudes as a function of the digital signal of the block, of the estimated statistical parameters, of the symbols of the sequence which are known a priori and of the previously estimated symbols.

20 Claims, 2 Drawing Sheets

SIGNAL PROCESSING METHOD AND DEVICE FOR A SPREAD SPECTRUM RADIO COMMUNICATION RECEIVER

BACKGROUND OF THE INVENTION

The present invention relates to systems for radio communication with mobiles. It lies within the receivers used in the fixed or mobile stations of such systems and operating coherent demodulation of spread spectrum signals.

Coherent demodulation requires various parameters representing the propagation channel between the transmitter and the receiver. Some of these parameters vary relatively slowly and can be estimated by statistical probing methods. Such is the case for example for the delays assigned to the multiple propagation paths in the conventional rake receiver. The delays specific to the various paths can be updated at fairly low frequency, for example of the order of a second. On the other hand, other parameters have abrupt variations, on the scale of the duration of an information symbol, due to the fading phenomenon. Such is the case in particular for the instantaneous amplitudes of reception of the symbols along the propagation paths taken into consideration, which are required for coherent demodulation. These instantaneous amplitudes are complex amplitudes, manifesting the attenuation and the phase shift undergone at each instant along the paths.

In general, these complex amplitudes are estimated from symbols known a priori, or pilot symbols, interspersed among the transmitted information symbols so as to allow coherent demodulation. This mode of estimation does not permit allowance for the fast channel variations between the patterns of pilot symbols.

An object of the present invention is to improve the consideration of fast fading in coherent demodulation schemes.

SUMMARY OF THE INVENTION

The invention thus proposes a method of processing a digital signal at the output of a filter matched to a spreading code in a spread spectrum radio communication receiver, the digital signal comprising successive blocks each corresponding to a sequence of symbols sent by a transmitter, each sequence comprising at least one symbol known a priori and information symbols. The method comprises an estimation of statistical parameters representing a channel having at least one propagation path between the transmitter and the receiver; and a processing of each block of the digital signal to estimate instantaneous amplitudes of reception of the symbols of the corresponding sequence sent by the transmitter. According to the invention, the processing of a block comprises the estimation of a group of at least one information symbol of the sequence by optimization of a criterion defined by the digital signal of said block, the estimated statistical parameters, at least one symbol of the sequence which is known a priori and each information symbol of said group; and the estimation of said instantaneous amplitudes as a function of the digital signal of said block, of the estimated statistical parameters, of the symbols of the sequence which are known a priori and of the estimated symbols of said group.

The method performs a joint optimization of some at least of the information symbols with the instantaneous amplitudes of reception of the symbols, thereby making it possible to improve the reliability of the estimations.

The method is applicable when the signals are transmitted on two parallel sub-channels between the transmitter and the receiver, for example two quadrature sub-channels only one of which comprises the pilot symbols. This is the case for the uplink, from the mobile terminals to the base stations, in the third-generation cellular systems of UMTS type ("Universal Mobile Telecommunications System"). The information symbols estimated jointly with the instantaneous amplitudes can then all be transmitted on the same sub-channel as the pilot symbols, these amplitudes subsequently being used to perform coherent demodulation on the other sub-channel.

The method is also applicable by performing the joint estimation only on certain of the information symbols time-division multiplexed with the pilot symbols, for example in the case of the downlink, from the base stations to the mobile terminals, in UMTS systems.

Another aspect of the present invention relates to a method of estimating the speed of movement of a mobile radio communication station based on a digital signal produced by a filter matched to a spreading code in a spread spectrum radio communication receiver, the digital signal comprising successive blocks each corresponding to a sequence of symbols sent by a transmitter, each sequence comprising at least one symbol known a priori, said mobile station comprising one of said transmitter and receiver. This method comprises storing a table of vectors for a collection of values of speed of movement of the mobile station, the table having, for each speed value, at least one entry containing an autocorrelation vector of instantaneous amplitudes of reception of symbols sent by the transmitter, precalculated according to a propagation model;

estimating the autocorrelation vector of the instantaneous amplitudes on the basis of the portions of the blocks corresponding to the symbols known a priori;

selecting an entry of the table of vectors, containing the precalculated autocorrelation vector closest to the estimated autocorrelation vector; and estimating the speed of movement of the mobile station on the basis of the selected entry.

It is thus possible to achieve reliable estimations of the speed of the mobile station, which may in particular be used in a signal processing method as defined above.

The invention also proposes signal processing devices tailored to the implementation of the above methods.

DESCRIPTION OF PREFERRED EMBODIMENTS

Figure 1:
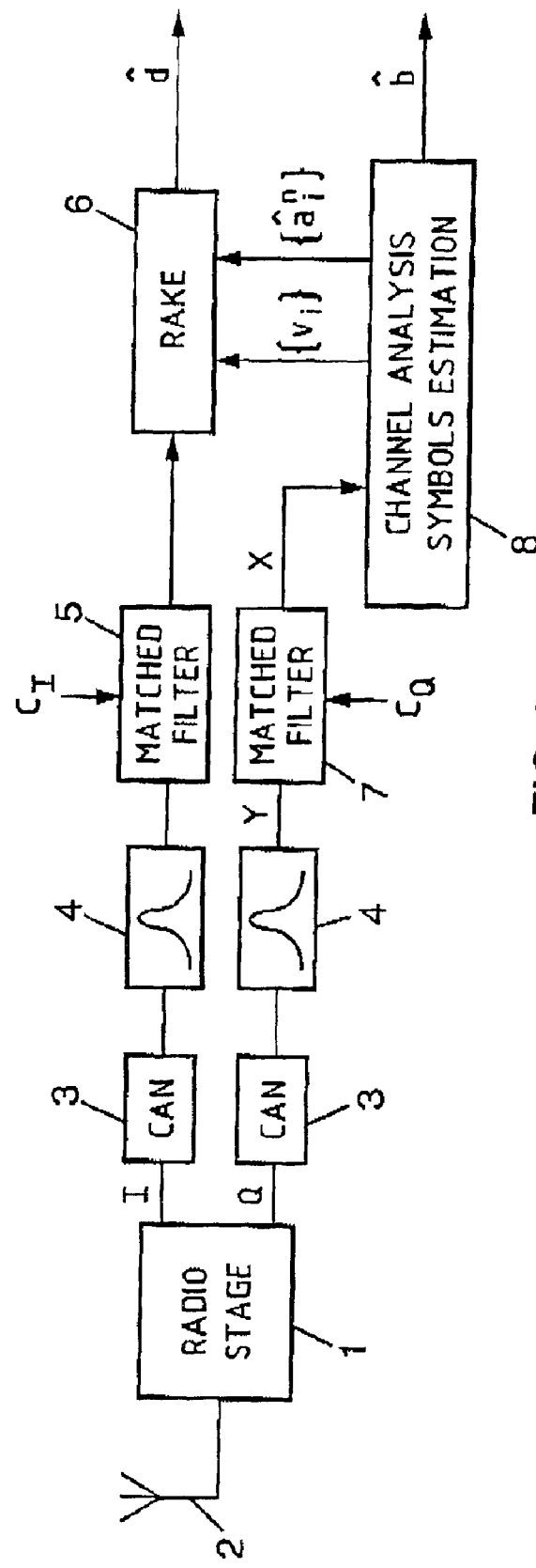
FIG. 1 is a schematic diagram of an exemplary radio communication receiver incorporating the invention.

The invention is described below within the framework of a spread spectrum radio communication system using a code-division multiple access technique (CDMA), of which UMTS is an example. A channel of such a system on a carrier frequency is defined by a spreading code composed of discrete samples called "chips", having real values ($\pm 1$) or complex values ($\pm 1 \pm j$), which follow one another at a chip rate $F_c$ ($F_c$=3.84 Mchip/s in the case of UMTS).

We consider the reception of a CDMA radio signal block along a multipath channel having additive white noise, the block resulting from a sequence of N symbols which is produced by a transmitter. The symbols are real valued ($\pm 1$)

or complex valued (±1±j). The duration $1/F_s$ of a symbol on a channel is a multiple of the duration of the chip, the ratio of the two being the spreading factor $Q=F_c/F_s$ of the channel. In the example of UMTS, a block can correspond to a timeslot of a 10 ms radio frame (i.e. 666 μs of signal since a frame comprises 15 timeslots), the spreading factor Q being a power of 2 lying between 4 and 256 with Q.N=2560 chips.

Moreover, L denotes the number of propagation paths allowed for by the receiver, and W the length of the impulse response of the channel, expressed as a number of chips. The propagation profile of the channel is defined by a set of eigenvectors $v_i$ and of associated eigenvalues $\lambda_i$ for $0 \leq i \leq L$. Each eigenvector $v_i$ of dimension W, is a waveform associated with an echo in the impulse response of the channel. In a traditional "rake" receiver, each eigenvector $v_i$ can have just one nonzero component, corresponding to a propagation delay allocated to a finger of the receiver. More generally, these vectors $v_i$ can have several nonzero components.

Each sequence of N symbols comprises a number $p_0$ of symbols which are known a priori, or pilot symbols. We are interested here in the reception of the portion of the block corresponding to a collection of p symbols of the sequence, including at least one information symbol unknown a priori. It is assumed that these p symbols comprise the $p_0$ pilot symbols ($p_0 < p \leq N$). They could however comprise just some (at least one) of the pilot symbols. The signal observed for the estimation of the parameters of the channel, composed of Q.p complex samples $y_0, y_1, \ldots, y_{Q.p-1}$, may be written:

$$Y = M.V.B(b).P.A + N' \quad (1)$$

where:

$A = (A_0, A_1 \ldots, A_{L-1})^T$ (with $A_i = (a_i^0, a_i^1, \ldots, a_i^{N-1})$ and $(.)^T$ designating the transposition operation) is a column vector with L.N components $a_i^n$ corresponding to the complex amplitudes (instantaneous fading realizations) for the various symbols, indexed by n, of the block and the various paths, indexed by i:

$$-P = \begin{pmatrix} \Pi & 0 & \cdots & 0 \\ 0 & \Pi & \ddots & \vdots \\ \vdots & \ddots & \ddots & 0 \\ 0 & \cdots & 0 & \Pi \end{pmatrix}$$

is a puncturing matrix of size L.p×L.N, in which a puncturing pattern Π of size p×N is repeated L times along the diagonal, the q-th row of the pattern Π ($1 \leq q \leq p$) being composed of N−1 times the value 0 and once the value 1 at the position corresponding to the q-th symbol of the collection of p symbols (P is the identity matrix of size L.N when p=N);

$b = (b_0, b_1, \ldots b_{p-1})^T$ is a vector of p components which are equal to the p symbols $b_0, b_1, \ldots b_{p-1}$ of said collection;

$$-B(b) = \begin{pmatrix} B'(b) & 0 & \cdots & 0 \\ 0 & B'(b) & \ddots & \vdots \\ \vdots & \ddots & \ddots & 0 \\ 0 & \cdots & 0 & B'(b) \end{pmatrix},$$

with $$B'(b) = \begin{pmatrix} b_0 & 0 & \cdots & 0 \\ 0 & b_1 & \ddots & \vdots \\ \vdots & \ddots & \ddots & 0 \\ 0 & \cdots & 0 & b_{p-1} \end{pmatrix}$$

is a diagonal matrix of size L.p×L.p where the diagonal sub-matrix B'(b) is repeated L times along the diagonal;

V is a matrix of size W.p×L.p containing the eigenvectors $v_i$ of the channel, which are assumed constant over the length of the block, i.e. $V = (V_0, V_1, \ldots, V_{L-1})$ where $V_i$ is a matrix of size W.p×p where the column vector $v_i$ is present p times:

$$V_i = \begin{pmatrix} v_i & 0 & \cdots & 0 \\ 0 & v_i & \ddots & \vdots \\ \vdots & \ddots & \ddots & 0 \\ 0 & \cdots & 0 & v_i \end{pmatrix};$$

M is a convolution matrix for convolving with the channel spreading code, of size Q.p×W.p, whereby the code portions corresponding to the p symbols observed have been concatenated;

N' is a column vector of size Q.p composed of samples of noise assumed to be additive and gaussian; and $Y = (y_0, y_1, \ldots, y_{Q.p-1})^T$ To estimate the $p-p_0$ unknown symbols and the L.N components of the vector A jointly, we seek to maximize the conditional probability pr(A,b|Y), which is proportional to pr(Y|A,b).pr(A,b). Since A and b are independent and all the sequences of bits are assumed equiprobable, we have to maximize pr(Y|A,b).pr(A), which is equivalent to minimizing the criterion:

$$\|Y - M.V.B(b).P.A\|^2 + N_0 A^H.K^{-1}.A \quad (2)$$

where $N_0$ is the variance of the noise, and K the autocorrelation matrix of the fading $K = E(A.A^H)$, where E(.) designates the mathematical expectation and $(.)^H$ the conjugate transpose.

By differentiating the criterion (2) with respect to the components of A, we can express A as a function of b and reintroduce the expression obtained in (2), this leading to searching for the vector $\hat{b}$ which maximizes the criterion:

$$Z^H.B(b).P.(P^H.P + N_0.K^{-1})^{-1}.P^H.B(b).Z \quad (3)$$

with;

$$Z = V^H.M^H.Y \quad (4)$$

We can subsequently obtain the estimate $\hat{A}$ of the vector A as a function of that $\hat{b}$ of the vector b:

$$\hat{A} = (P^H.P + N_0.K^{-1})^{-1}.P^H.B(\hat{b}).Z \quad (5)$$

By means of this estimate $\hat{A}$, the remaining information symbols can be subjected to coherent demodulation in a "rake" receiver of conventional type. These remaining symbols can be those which have not already been estimated on the basis of the current block (in the case where p<N).

If several blocks are transmitted in parallel, for example on two quadrature sub-channels, the estimate $\hat{A}$ is used to demodulate a block transmitted in parallel.

FIG. 1 shows a CDMA receiver of the latter type, which processes blocks transmitted in parallel on two quadrature sub-channels (I and Q). This receiver can belong to a base station ("node B") of a UMTS type network in FDD mode ("Frequency Division Duplex"). The I sub-channel (real part of the complex baseband signal) transports only data bits, while the Q sub-channel (imaginary part) transports N control bits with a spreading factor Q=256. These N control bits include $p_0$ pilot bits and $N-p_0$ bits carrying control information unknown a priori to the receiver. For a precise description of these uplink channels, reference may be made to the technical specification 3G TS 25.211, version 3.3.0, "Physical Channels and Mapping of Transport Channels onto Physical Channels (FDD) (Release 1999)", published in June 2000 by the 3GPP ("$3^{rd}$ Generation Partnership Project"), Section 5.2.1. The number $p_0$ of pilot bits lies between 3 and 8, and the other control bits include $N_{TPC}=1$ or 2 bits carrying transmission power control commands, $N_{TFCI}=0, 2, 3$ or 4 bits indicating a transport format combination used on the channel and $N_{FBI}=0, 1$ or 2 feedback information bits.

The receiver illustrated by FIG. 1 comprises a radio stage 1 which performs the analogue processing required on the radio signal picked up by the antenna 2. The radio stage 1 delivers a complex analogue signal whose real and imaginary parts are digitized by the analogue/digital converters 3 on respective I and Q processing sub-channels. On each sub-channels, a filter 4 matched to the shaping of the pulses by the transmitter produces a digital signal at the chip rate of the spreading codes.

On the I sub-channel, this signal is subjected to a matched filter 5 corresponding to the spreading code $c_I$ assigned to the data bits of the channel. The resulting signal is processed by a conventional rake receiver 6 which delivers estimates $\hat{d}$ of the transmitted data bits.

On the Q sub-channel, another matched filter 7, operating with the spreading code $c_Q$ with spreading factor Q=256 transforms each digital signal block Y from the filter 4 into a block X submitted to a channel analysis and control bits estimation unit 8. The unit 8 supplies the rake receiver 6 with the eigenvectors $v_i$ relating to the L propagation paths considered, as well as the estimated instantaneous complex amplitudes $\hat{a}_i^n$ ($0 \leq i < L$, $0 \leq n < N$) corresponding to the N=10 bits transmitted on the Q sub-channel.

With the notation of model (1) and with p=N, the signal block X of size W.N delivered by the matched filter 7 can be written in the form of a column vector $X=M^H.Y$.

Figure 2:
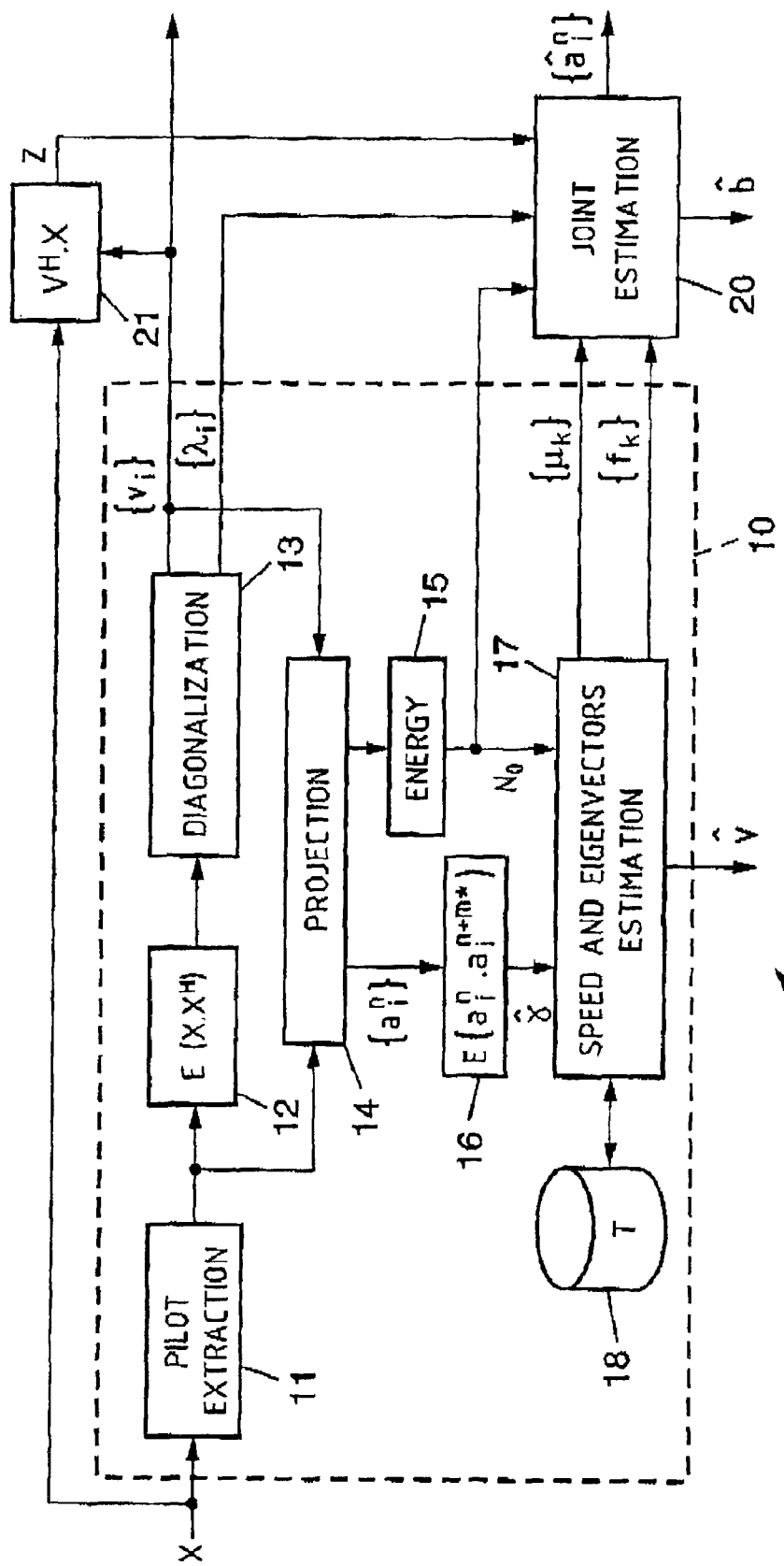
FIG. 2 is a schematic diagram of a channel analysis and symbols estimation unit of the receiver of FIG. 1.

A schematic diagram of the unit 8 is represented in FIG. 2. The units 10 surrounded by a broken line serve to calculate statistical parameters representing the propagation channel between the transmitter and the receiver, namely the eigenvectors $v_i$ supplied to the rake receiver 6, the estimate $N_0$ of the variance of the noise and the parameters characterizing the autocorrelation matrix $K=E(A.A^H)$.

If it is assumed that the realizations of the fading are independent random variables for two different paths, then we can write:

$$K = \begin{pmatrix} K_0 & 0 & \cdots & 0 \\ 0 & K_1 & \ddots & \vdots \\ \vdots & \ddots & \ddots & 0 \\ 0 & \cdots & 0 & K_{L-1} \end{pmatrix} \quad (6)$$

where $K_i$ is an autocorrelation matrix of size N×N relating to path i. It is further assumed that these autocorrelation matrices $K_i$ are proportional, i.e. $K_i = \lambda_i . \overline{K}$, $\lambda_i$ being the eigenvalue corresponding to the eigenvector $v_i$ of the path, and $\overline{K}$ being normalized for a unit energy. The eigenvector decomposition of the matrix $\overline{K}$ can be written:

$$\overline{K} = \sum_{k=0}^{F-1} \mu_k . f_k . f_k^H \quad (7)$$

where F is the number of eigenvectors to be taken into consideration which (like the eigenvectors and eigenvalues in question) depends on the speed of movement of the mobile terminal. The normalization of $\overline{K}$ implies that $$\sum_{k=0}^{F-1} \mu_k = N.$$

The eigenelements $\mu_k$, $f_k$ can be calculated by estimating the matrix K and by extracting them via an appropriate algorithm. Another solution, requiring less computation power, consists in selecting these eigenelements as a function of an estimate of the speed of the mobile station.

The correlation matrix K is thus characterized by the quantities $\lambda_i$, $\mu_k$ and $f_k$ for $0 \leq i < L$ and $0 \leq k < F$. These elements are supplied to a joint estimation module 20, which minimizes the criterion (3), which is equivalent to maximizing the criterion:

$$\sum_{i=0}^{L-1} \sum_{k=0}^{F-1} \frac{\lambda_i - \mu_k}{\lambda_i . \mu_k + N_0} |f_k^H . B'(b).Z_i|^2 \quad (8)$$

where $Z_i = V_i^H.X$. The module 20 determines the estimate $\hat{b}$ by maximizing criterion (8), then it obtains the estimates $\hat{a}_i^n$ by applying formula (5), which may also be written, in the example considered:

$$\hat{A}_i = \sum_{k=0}^{F-1} \frac{\lambda_i - \mu_k}{\lambda_i - \mu_k + N_0} (f_k^H . B'(\hat{b}) . Z_i) . f_k^T \quad (9)$$

It is noted that the coefficients used in equation (9) have already been calculated when maximizing the criterion (8).

The convolution product, followed by a projection, $Z=V^H.M^H.Y=V^H.X=(Z_0^T, Z_1^T, \ldots, Z_{L-1}^T)^T$, is calculated by a module 21 over the entire length of the block so as to be processed by the joint estimation module 20.

In order to minimize (3) or maximize (8) the module 20 can undertake an exhaustive calculation of the values of the criterion according to the various possible values of the unknown control bits, and retain the set of values which yields the optimal value. To do this, it can take advantage of the redundancy which may exist between certain of the bits of the control sub-channel. For example, when $N_{TPC}=2$, it is in fact the same power control bit which is transmitted twice, thereby reducing the number of combinations of bits which have to be tested.

The units 10 determine the eigenvectors and eigenvalues $v_i$, $\lambda_i$ in a conventional manner from the portions of the signal blocks corresponding to the pilot bits. The module 11 extracts these portions of the successive blocks, and the module 12 estimates, over these portions, the mathematical expectation of the matrix $X.X^H$. This may be performed by a calculation of a mean over around 100 blocks. The eigenelements $v_i$, $\lambda_i$ are then calculated by the module 13 by diagonalization of the matrix $E(X.X^H)$, the L eigenvectors retained $v_i$ being those for which the eigenvalues $\lambda_i$ have the largest moduli.

By projecting the signal portions corresponding to the pilot bits onto the vectors $v_i$, the module 14 obtains the instantaneous amplitudes $a_i^n$ relating to the $p_0$ pilot bits ($0 \leq n < p_0$), as well as a residual value corresponding to a noise sample. The mean energy of these samples is evaluated by a module 15 in order to obtain the estimate of the parameter $N_0$. Moreover, a module 16 estimates, over an averaging window which may also be of the order of 100 blocks, the mathematical expectations of the quantities $a_i^n \cdot a_i^{n+m*}$ which form the components $\hat{\gamma}_m = E(a_i^n \cdot a_i^{n+m*})$ of an autocorrelation vector $\hat{\gamma}$ of the instantaneous amplitudes ($0 \leq m < p_0$).

The estimates $N_0$ and $\hat{\gamma}$ are supplied to a module 17 which estimates the eigenelements $\mu_k$, $f_k$ as well as the speed of movement of the mobile terminal. This module 17 cooperates with a memory 18 wherein is recorded a table T of autocorrelation vectors of eigenelements.

This table T contains autocorrelation vectors $\gamma$ and sets of vectors of the eigenvalues $f_k$, $\mu_k$ for one or more radio propagation models and for several values of speed of movement of the mobile terminal.

By way of example, two types of propagation models, indexed by an integer m, may be taken into consideration, namely a Rayleigh channel and a Rice channel.

For each model m, and for various values of speed v, it is possible to calculate in advance the components of the autocorrelation vector, denoted $\gamma(m,v)$, of the instantaneous amplitudes for a noise level assumed zero, as well as the eigenelements $f_k$, $\mu_k$ of the matrix $\overline{K}$. An entry $T(m,v)$ respectively containing the vector $\gamma(m,v)$, the number $F(m,v)$ of eigenelements taken into consideration, and the eigenelements in question $f_k(m,v)$, $\mu_k(m,v)$ for $0 \leq k < F(m,v)$ is then recorded in the table T. This table T is calculated once and for all and recorded in the memory 18.

Subsequently, when the module 17 receives, for example every 100 blocks, estimates $\gamma$ and $N_0$, it can select from the table 18 the autocorrelation vector which corresponds best to that which was estimated, while taking into account the presence of the noise on the channel. To do this, the module 17 can perform a minimization in the least squares sense, i.e. find the model m and the tabulated speed v which minimize the quantity $\|\hat{\gamma} - N_0 \cdot \delta_0 - \gamma(m,v)\|^2$, where $\delta_0 = (1, 0, 0, \ldots, 0)^T$.

The eigenvectors and eigenvalues $f_k$, $\mu_k$ which are located in the selected entry of the table T may then be supplied to the joint estimation module 20.

The minimization performed by the module 17 furthermore makes it possible to obtain an estimate of the speed of movement of the mobile terminal. This is the speed corresponding to the entry selected from the table T. This estimate v can be supplied to various other processing units of the radio communication system, making it possible to tailor the behavior of the system to the speed of the mobile terminals.

It has been found that the speed estimates obtained by this procedure were more reliable than those obtained by the conventional linear estimators.

We claim:

1. A method of processing a digital signal at an output of a filter matched to a spreading code in a spread spectrum radio communication receiver, the digital signal comprising successive blocks each corresponding to a sequence of symbols sent by a transmitter, each sequence comprising at least one symbol known a priori and information symbols, the method comprising the steps of:

estimating statistical parameters representing a channel having at least one propagation path between the transmitter and the receiver; and processing each block of the digital signal to estimate instantaneous amplitudes of reception of the symbols of the corresponding sequence sent by the transmitter, wherein the processing of a block comprises the steps of:

estimating a group of at least one information symbol of the sequence by optimizing a criterion defined by the digital signal of said block, the estimated statistical parameters, at least one symbol of the sequence which is known a priori and each information symbol of said group; then, estimating said instantaneous amplitudes as a function of the digital signal of said block, of the estimated statistical parameters, of the symbols of the sequence which are known a priori and of the estimated symbols of said group.

2. A method according to claim 1, wherein the symbols of said group carry radio link control information.

3. A method according to claim 1, wherein the estimation of the group of information symbols comprises an exhaustive calculation of said criterion for the various possible values of the symbols of the group.

4. A method according to claim 3, wherein said group comprises redundant information symbols.

5. A method according to claim 1, wherein the statistical parameters representing the channel are estimated on the basis of block portions corresponding to the symbols known a priori.

6. A method according to claim 5, wherein the statistical parameters representing the channel comprise eigenvalues and eigenvectors of an autocorrelation matrix of the instantaneous amplitudes.

7. A method according to claim 6, wherein a table of eigenelements is stored for a collection of values of speed of movement of a mobile station comprising one of said transmitter and receiver, wherein said table has, for each speed value, at least one entry containing a set of eigenvalues and eigenvectors of said autocorrelation matrix, which are precalculated according to a propagation model, and wherein the estimation of the statistical parameters comprises the selection of an entry of the table of eigenelements.

8. Method according to claim 7, wherein each entry of the table of eigenelements for a speed value further contains an instantaneous amplitudes autocorrelation vector, precalculated according to the same propagation model, wherein the autocorrelation vector of the instantaneous amplitudes is estimated on the basis of block portions corresponding to the symbols known a priori, and wherein the entry of the table of eigenelements is selected as containing the precalculated autocorrelation vector closest to the estimated autocorrelation vector.

9. Method of estimating a speed of movement of a mobile radio communication station based on a digital signal produced by a filter matched to a spreading code in a spread spectrum radio communication receiver, the digital signal comprising successive blocks each corresponding to a sequence of symbols sent by a transmitter, each sequence comprising at least one symbol known a priori, said mobile station comprising one of said transmitter and receiver, the method comprising the steps of:

storing a table of vectors for a collection of values of speed of movement of the mobile station, the table having, for each speed value, at least one entry containing an autocorrelation vector of instantaneous amplitudes of reception of symbols sent by the transmitter, precalculated according to a propagation model;

estimating the autocorrelation vector of the instantaneous amplitudes on the basis of block portions corresponding to the symbols known a priori;

selecting an entry of the table of vectors, containing the precalculated autocorrelation vector closest to the estimated autocorrelation vector; and estimating the speed of movement of the mobile station on the basis of the selected entry.

10. A method according to claim 9, wherein the table of vectors has entries containing respective autocorrelation vectors precalculated according to a plurality of propagation models.

11. A device for processing a digital signal at an output of a filter matched to a spreading code in a spread spectrum radio communication receiver, the digital signal comprising successive blocks each corresponding to a sequence of symbols sent by a transmitter, each sequence comprising at least one symbol known a priori and information symbols, the device comprising:

means for estimating statistical parameters representing a channel having at least one propagation path between the transmitter and the receiver; and means for processing each block of digital signal so as to estimate instantaneous amplitudes of reception of the symbols of the corresponding sequence sent by the transmitter, wherein the processing means comprise:

means for estimating a group of at least one information symbol of the sequence by optimizing a criterion defined by the digital signal of said block, the estimated statistical parameters, at least one symbol of the sequence which is known a priori and each information symbol of said group; and means for estimating said instantaneous amplitudes as a function of the digital signal of said block, of the estimated statistical parameters, of the symbols of the sequence which are known a priori and of the estimated symbols of said group.

12. A device according to claim 11, wherein the symbols of said group carry radio link control information.

13. A device according to claim 11, wherein the means of estimation of the group of information symbols comprise means of exhaustive calculation of said criterion for the various possible values of the symbols of the group.

14. A device according to claim 13, wherein said group comprises redundant information symbols.

15. A device according to claim 11, wherein the means of estimation of the statistical parameters are arranged to operate on the basis of block portions corresponding to the symbols known a priori.

16. A device according to claim 15, wherein the statistical parameters representing the channel comprise eigenvalues and eigenvectors of an autocorrelation matrix of the instantaneous amplitudes.

17. A device according to claim 16, wherein the means of estimation of the statistical parameters comprise a memory for storing a table of eigenelements for a collection of values of speed of movement of a mobile station comprising one of said transmitter and receiver, the table having, for each speed value, at least one entry containing a set of eigenvalues and eigenvectors of said autocorrelation matrix, which are precalculated according to a propagation model, and means of selection of an entry of the table of eigenelements.

18. A device according to claim 17, wherein each entry of the table of eigenelements for a speed value further contains an instantaneous amplitudes autocorrelation vector, precalculated according to the same propagation model, wherein the means of estimation of the statistical parameters comprise means for estimating the autocorrelation vector of the instantaneous amplitudes on the basis of the block portions corresponding to the symbols known a priori, and wherein the means of selection are arranged to select the entry of the table of eigenelements containing the precalculated autocorrelation vector closest to the estimated autocorrelation vector.

19. A device for estimating a speed of movement of a mobile radio communication station based on a digital signal produced by a filter matched to a spreading code in a spread spectrum radio communication receiver, the digital signal comprising successive blocks each corresponding to a sequence of symbols sent by a transmitter, each sequence comprising at least one symbol known a priori, said mobile station comprising one of said transmitter and receiver, the device comprising:

a memory for storing a table of vectors for a collection of values of speed of movement of the mobile station, the table having, for each speed value, at least one entry containing an autocorrelation vector of instantaneous amplitudes of reception of symbols sent by the transmitter, precalculated according to a propagation model;

means for estimating the autocorrelation vector of the instantaneous amplitudes on the basis of block portions corresponding to the symbols known a priori;

means for selecting an entry of the table of vectors, containing the precalculated autocorrelation vector closest to the estimated autocorrelation vector; and means for estimating the speed of movement of the mobile station on the basis of the selected entry.

20. A device according to claim 19, wherein the table of vectors has entries containing respective autocorrelation vectors precalculated according to several propagation models.

* * * * *